United States Patent [19]

Schuler

[11] Patent Number: 5,590,963
[45] Date of Patent: Jan. 7, 1997

[54] VERTICAL FEED MIXER WITH HAY CLAWS

[75] Inventor: Reggie L. Schuler, Griswold, Iowa

[73] Assignee: Schuler Manufacturing & Equipment Co., Inc., Griswold, Iowa

[21] Appl. No.: 629,504

[22] Filed: Apr. 9, 1996

[51] Int. Cl.$^6$ .............................. B01F 7/24; B02C 18/08
[52] U.S. Cl. ........................ 366/302; 366/314; 366/603; 241/101.76; 241/605
[58] Field of Search ................................ 366/64–66, 189, 366/266, 194–196, 302, 307, 314, 318, 603, 306; 241/46.02, 46.06, 46.17, 46.11, 82.7, 98, 101.76, 101.8, 186.5, 260.1, 605; 414/310, 319, 326

[56] References Cited

U.S. PATENT DOCUMENTS

| | | |
|---|---|---|
| 2,746,730 | 5/1956 | Swenson . |
| 2,836,401 | 5/1958 | Phelan . |
| 3,667,734 | 6/1972 | Skromme et al. . |
| 3,672,640 | 6/1972 | Crose . |
| 3,729,177 | 4/1973 | Keyes et al. . |
| 3,797,807 | 3/1974 | Behrens . |
| 3,820,761 | 6/1974 | Rigal . |
| 3,997,146 | 12/1976 | Kline . |
| 4,003,502 | 1/1977 | Barcell ................................ 366/603 X |
| 4,026,529 | 5/1977 | Kline et al. . |
| 4,310,252 | 1/1982 | Ryan ...................................... 366/186 |
| 4,362,272 | 12/1982 | Martin ........................................ 239/7 |
| 4,395,131 | 7/1983 | Barlow ................................... 366/141 |
| 4,506,990 | 3/1985 | Neier et al. ............................. 366/299 |
| 4,593,861 | 6/1986 | Blakley et al. ........................ 241/46.02 |
| 4,597,672 | 7/1986 | Neier et al. ............................. 366/186 |
| 4,607,802 | 8/1986 | Lamort ................................... 241/46 B |
| 4,707,140 | 11/1987 | Mohrlang ............................... 366/186 |
| 4,725,007 | 2/1988 | Chupka .................................. 241/46.02 |
| 4,799,800 | 1/1989 | Schuler .................................... 366/296 |
| 4,896,970 | 1/1990 | Schuler .................................... 366/296 |
| 4,900,158 | 2/1990 | Ugolini .................................... 366/143 |
| 5,020,918 | 6/1991 | Faccia ...................................... 366/279 |
| 5,082,188 | 1/1992 | Urich ......................................... 241/56 |
| 5,175,917 | 1/1993 | Faccia ....................................... 29/267 |
| 5,294,064 | 3/1994 | Faccia .................................... 241/101.7 |
| 5,429,436 | 7/1995 | Stone .................................... 366/314 X |
| 5,456,416 | 10/1995 | Hartwig ................................. 241/260.1 |
| 5,462,354 | 10/1995 | Neier ....................................... 366/314 |

FOREIGN PATENT DOCUMENTS

| | | |
|---|---|---|
| 3721457A1 | 1/1989 | Germany . |
| 494372 | 5/1954 | Italy . |
| 1298117 | 11/1972 | United Kingdom . |

*Primary Examiner*—Charles E. Cooley
*Attorney, Agent, or Firm*—Zarley, McKee, Thomte, Voorhees, & Sease

[57] ABSTRACT

An improved vertical feed mixer has a mixing chamber defined by a bottom wall, a side wall, and an open upper end through which feed material, such as hay bales, is loaded into the chamber. A vertically disposed auger with tapered flighting is rotatably mounted within the chamber for cutting, mixing, and discharging the feed material through a discharge opening near the bottom of the chamber. A plurality of hay claws prevent hay from spilling over the top edge of the mixing chamber. The hay claws also catch the hay bales, or portions thereof, to inhibit rotation of the hay with the rotating auger, thereby allowing the knife blades on the auger to cut the hay. A plurality of grader blades extend outwardly from the auger shaft in close proximity to the bottom wall of the mixing chamber, thereby pushing mixed feed outwardly through the discharge opening a plurality of times during each revolution of the auger, thereby providing increased uniformity of the discharge flow of material into a feed bunk or trough.

9 Claims, 3 Drawing Sheets

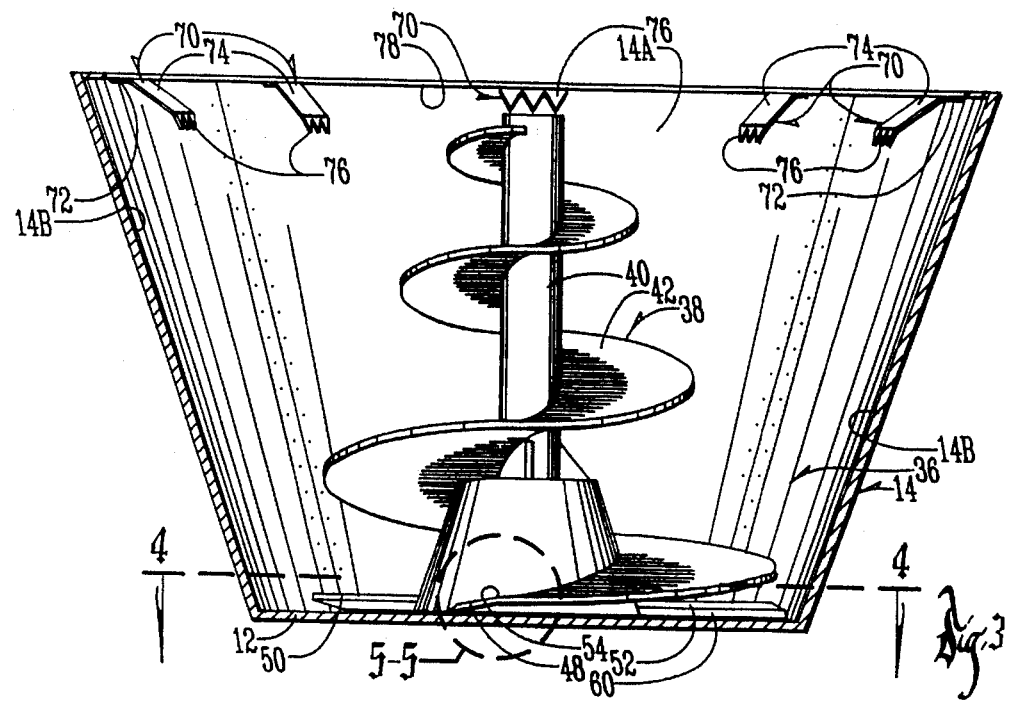
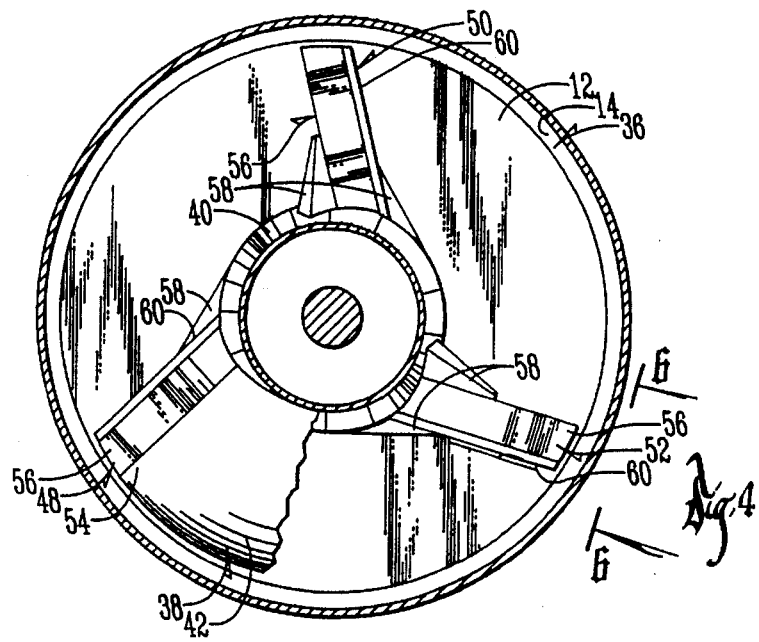
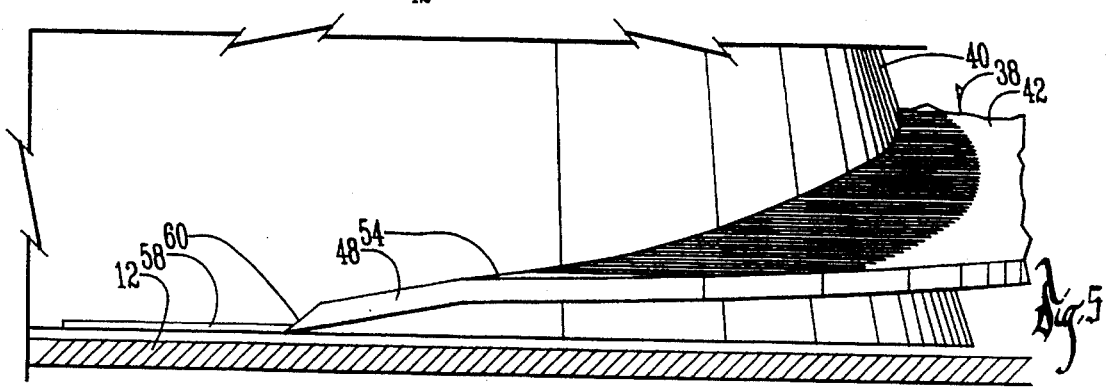

5,590,963

VERTICAL FEED MIXER WITH HAY CLAWS

BACKGROUND OF THE INVENTION

Vertical feed mixers are known for cutting and mixing hay and other feed ingredients, and for discharging the mixed composition into cattle feed bunks. These prior art vertical feed mixers include a bottom wall and a sidewall defining a mixing chamber with a vertically disposed auger therein. Knife blades are typically mounted on the outer edge of the auger flighting so as to cut hay that is deposited into the chamber from the open upper end. A discharge opening at the lower end of the mixing chamber allows the mixed feed composition to be pushed outwardly by the leading edge of the rotating auger. However, a problem exists in these prior art vertical feed mixers in that the hay or other long grain forage material tends to spill over the top edge of the sidewall during the cutting and mixing process. Also, as the auger rotates, the hay bale or portions thereof sometimes rotates and moves with the auger, rather than being cut by the auger, thereby increasing the time required for cutting and mixing.

Accordingly, a primary objective of the present invention is the provision of an improved vertical feed mixer for cutting and mixing feed material such as hay.

A further objective of the present invention is the provision of a vertical feed mixer having a plurality of claws for maintaining hay in the mixing chamber during the cutting and mixing process.

Still another objective of the present invention is the provision of a vertical feed mixer having a plurality of claws to impede or prevent rotation of hay with the rotating auger.

Another objective of the present invention is the provision of an improved vertical feed mixer which is economical to manufacture and durable and efficient in use.

These and other objectives will become apparent from the following description of the invention.

SUMMARY OF THE INVENTION

The improved vertical feed mixer of the present invention includes a bottom wall and a sidewall which define a mixing chamber. The upper end of the chamber is open so as to receive the feed material to be cut and mixed, such as round or square bales of hay and other feed supplements and ingredients. A discharge opening is provided in the sidewall adjacent the bottom wall, with a door movable between open and closed positions. An auger is rotatably mounted within the chamber, with a vertically disposed shaft and tapered flighting. The flighting includes a plurality of knife blades for cutting the hay.

According to the present invention, a plurality of hay claws are attached to the sidewall adjacent the upper edge of the mixing chamber. During the feed cutting and mixing operation, hay bales are loaded into the open upper end of the mixing chamber. The auger is actuated to rotate and thereby cut the hay. The hay claws prevent the bale or portions thereof from migrating or spilling over the top edge of the chamber. The claws also grip or catch the hay to impede or prevent rotation of the hay with the auger. Thus, the claws allow the hay to be effectively and efficiently cut by the knives on the auger.

BRIEF DESCRIPTION OF THE DRAWINGS

FIG. 3 is a sectional view taken along lines 3—3 of FIG. 2.

FIG. 4 is a sectional view taken along lines 4—4 of FIG. 3.

FIG. 5 is an enlarged view taken along lines 5—5 of FIG. 3 and showing the grader blade on the leading edge of the flighting of the auger.

DETAILED DESCRIPTION OF THE DRAWINGS

Figure 1:
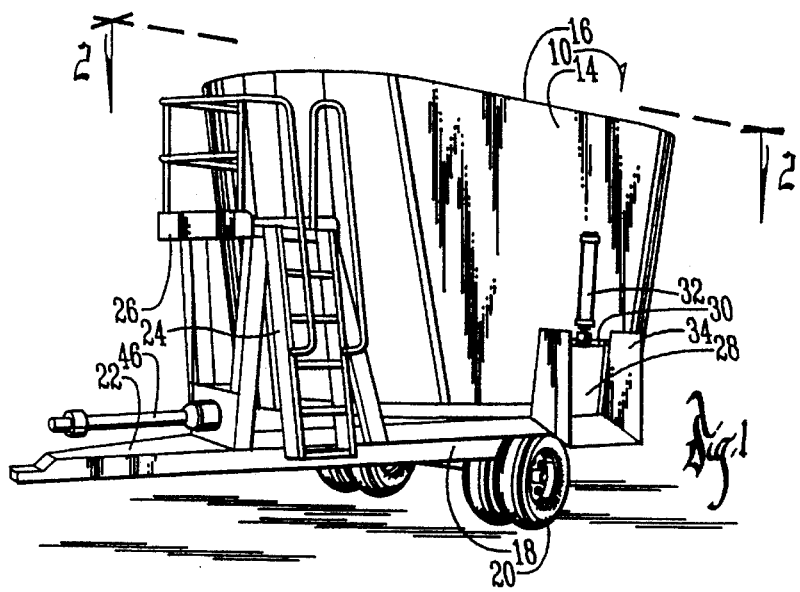
FIG. 1 is a perspective view of a vertical feed mixer.

With reference to the drawings, a vertical feed mixer is generally designated by the reference numeral 10. The mixer includes a bottom wall 12, a sidewall 14, and an open upper end 16. The mixer 10 is mounted upon a frame 18, including wheels 20. A tongue 22 extending from the frame is adapted to be hitched to a tractor or other prime mover. A ladder 24 is provided on the frame 18, with a platform 26 so that a person can look into the open upper end 16 of the mixer 10. The sidewall 14 includes a discharge opening 28, with a discharge door 30 movable between open and closed positions by a hydraulic cylinder 32. A discharge chute 34 extends outwardly adjacent the discharge opening 28.

Figure 2:
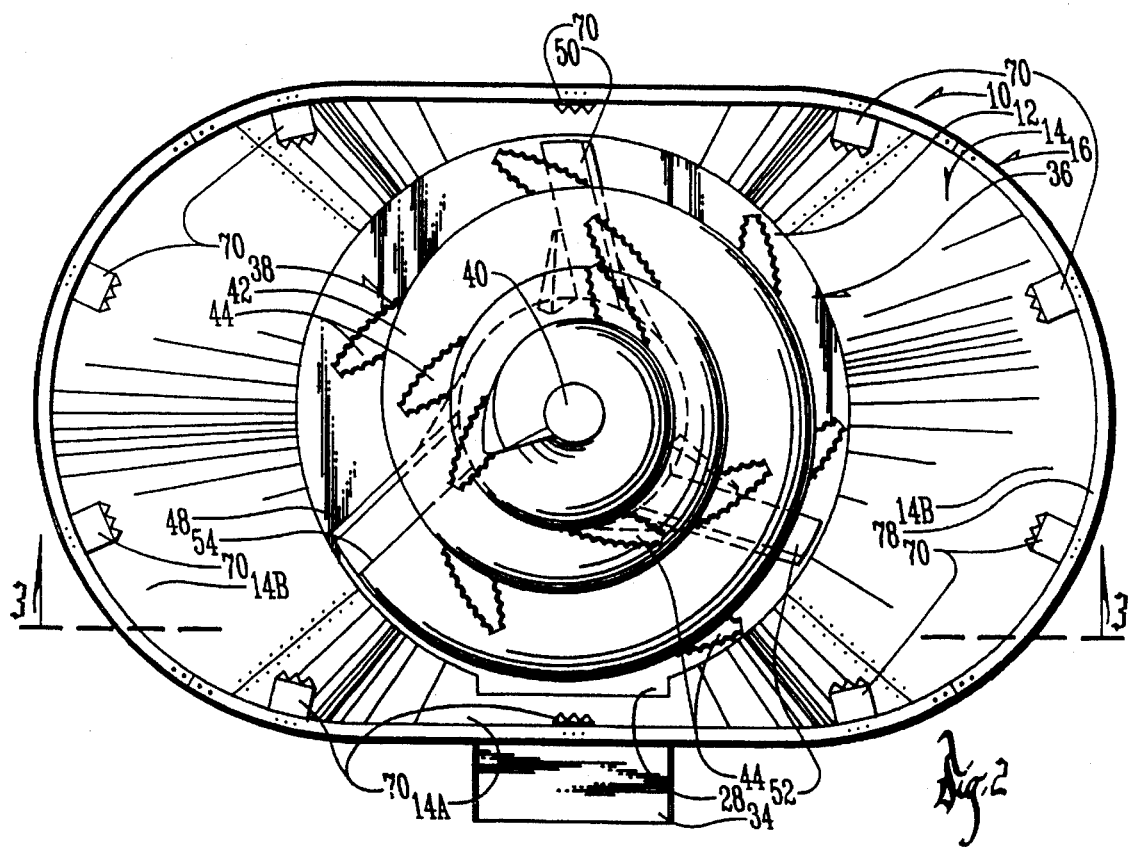
FIG. 2 is a top plan view taken along lines 2—2 of FIG. 1.
Figure 6:
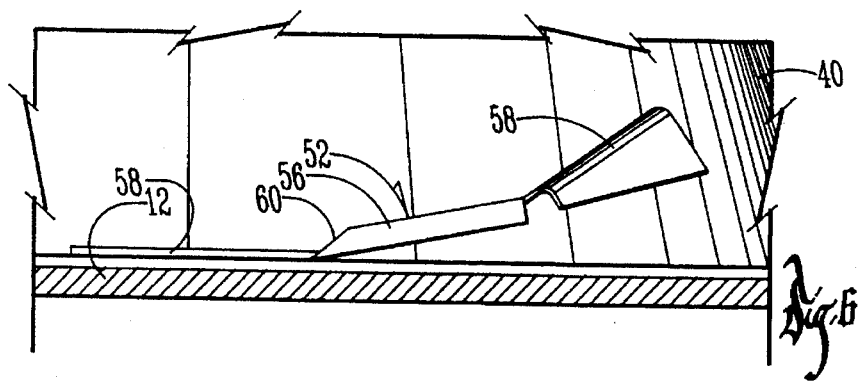
FIG. 6 is a view taken along lines 6—6 of FIG. 4.
Figure 7:
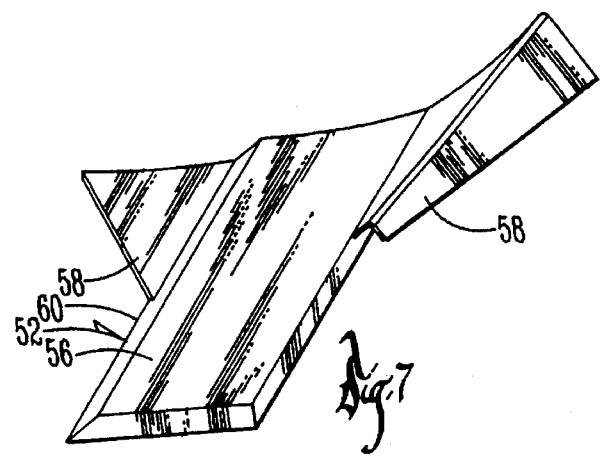
FIG. 7 is a perspective view of a grader blade located at the bottom of the auger.

The bottom wall 12 and the sidewall 14 define a mixing chamber 36. An auger 38 is rotatably mounted within the mixing chamber 36, and includes a vertically disposed shaft 40 with a tapered flighting 42. A plurality of knife blades 44 extend from the peripheral edge of the flighting 42 for cutting feed material, such as round or square hay bales, loaded into the open upper end 16 of the mixer 10. The drive train 46 for rotating the auger 38 is operatively connected to the PTO of the tractor. The sidewall 14 is oval or oblong in cross section, as seen in FIG. 2. Thus, the sides 14A of the sidewall are closer to the auger than are the ends 14B of the sidewall. The sidewall 14 is also tapered along its height, such that the mixing chamber 36 has an inverted conical shape.

The above description of the vertical feed mixer 10 is conventional, and does not constitute a part of the present invention.

A plurality of grader blades 48, 50, 52 are provided on the lower end of the auger 38 to enhance the discharge of mixed feed from the mixing chamber 36 through the discharge opening 28. As best seen in FIG. 4, the grader blade 48 is welded or otherwise secured to the leading edge 54 of the flighting 42. The other grader blades 50, 52 are spaced 120° from one another and from the grader blade 48. The grader blades 50, 52 each include an elongated arm 56 extending outwardly from the base of the auger shaft 40, with reinforcing braces 58 providing structural support between the arms 56 and the base of the auger shaft 40. Preferably, each arm 56 is angled slightly rearwardly, approximately 10°–20° as shown in FIG. 4, with respect to a radius. The grader blades 48, 50, 52 include a beveled leading edge 60 which is in close proximity to the bottom wall 12 of the mixer 10. The grader blades 48, 50, 52 are made from hardened abrasion resistant steel.

Figure 8:
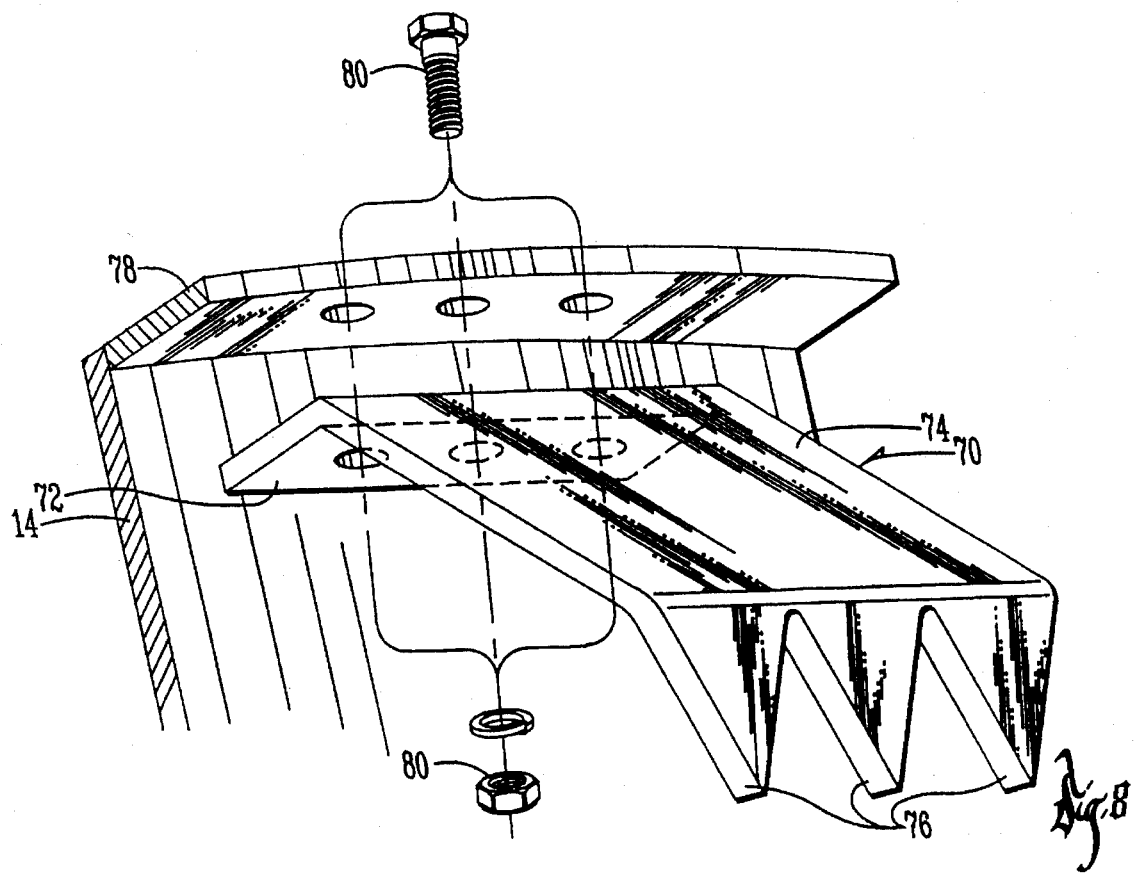
FIG. 8 is an enlarged view of a hay claw of the present invention.

The present invention is directed towards a plurality of hay claws 70 which are attached to the mixing chamber 36 adjacent the upper end 16 thereof. The hay claws 70 extend inwardly so as to catch or grip hay bales, or portions thereof, in the mixing chamber 36. More particularly, each hay claw 70 includes a securing flange 72, a body portion 74, and one or more projections or prongs 76, as best seen in FIG. 8. Preferably, each hay claw 70 is of one-piece construction, and made from a rigid material, such as ⅜" plate steel. As seen in FIG. 8, the securing flange 72 and the prongs 76 are angularly disposed with respect to the body portion 74. Thus, the prongs 76 extend inwardly and downwardly from the upper edge of the mixing chamber 36. The securing flange 72 is attached to a lip 78, or directly to the sidewall 14 in any convenient manner, such as with nuts and bolts 80. Alternatively, the hay claws 70 can be welded to the upper edge of the mixing chamber 36.

It is noted that a shortened hay claw is used on the sides 14A of the chamber 36, as seen in FIG. 2. The shortened claws include a securing flange 72 and prongs 76, but do not have a body portion between the flange and prongs.

In operation, hay or other long grain forage feed material is loaded into the open upper end 16 of the mixer 10 while the auger 38 is rotating. The knife blades 44 cut and slice the hay or forage, even if large round or square bales are loaded into the mixer 10. Additional feed supplements or ingredients may also be added into the mixing chamber 36 for mixture with the hay or forage. As shown in the drawings, the auger 38 rotates in a clockwise direction. Due to the oblong or oval shape of the mixing chamber 36, the hay tends to migrate downwardly at the ends 14B of the sidewall 14 and migrate upwardly adjacent the opposite sides 14A of the mixing chamber. This upward and downward flow of the hay and other feed material provides a percolation which enhances the cutting and mixing operation. Thus, as feed material falls to the bottom of the mixing chamber 36, the flighting 42 on the auger 38 lifts the material upwardly so as to create a continuous fountain-type flow of material through the mixing chamber 36. During this mixing operation, the discharge door 38 is closed so that no feed material is discharged through the opening 28.

The hay claws 70 prevent the percolating hay and feed material from spilling over the upper edge of the mixing chamber 36. Also, the prongs 76 of the hay claws 70 catch or grip the hay or other long grained forage material to prevent rotation of the hay with the auger 38. Thus, the hay will not rotate at the same rpm as the auger 38. This temporary holding of the hay allows the knives 44 on the auger 38 to cut the hay or hay bale, which will then continue the percolating flow through the mixing chamber 36. Thus, the time for the cutting and mixing operation to be completed is minimized.

Upon completion of the mixing operation, the hydraulic cylinder 32 is actuated so as to open the door 30 such that mixed feed can be discharged through the opening 28. After the door 30 is opened, the auger 38 rotates in a clockwise direction such that the grader blades 48, 50, 52 push mixed feed outwardly through the opening 28 whereby the mixed feed falls down the discharge chute 34 into a feed bunk or trough (not shown). The close proximity of the leading edge 60 of the grader blades 48, 50 and 52 to the bottom wall 12 of the mixer 10 allows the grader blades to scrape material from the floor of the mixing chamber for discharge through the discharge opening 28. As best seen in FIG. 5, the grader blades are inclined slightly from front to back, so as to impart a lifting action or motion to the feed material. Also, the rearward angular orientation of the longitudinal axis of the arm 56 of each grader blade relative to a radius facilitates the pushing of mixed feed out the discharge opening 28. The beveled leading edge 60 of the grader blades also reduces the torque required to push the blades through the feed material.

Preferably, during the cutting, mixing and discharge operations, the auger 38 is rotated between 20–35 revolutions per minute. For quick clean-out of residual feed material from the mixing chamber 36, the auger 28 may be rotated up to 40 rpm. Preferably, the rotational speed of the auger may vary depending upon the type of feed material being cut and mixed.

Thus, with the three grader blades shown in the drawings, feed is pushed out of the mixing chamber three times during each revolution of the auger 38. In the absence of grader blades 50 and 52, the feed material would be pushed out of the mixing chamber by the leading edge of the flighting only once during each revolution of the auger. Thus, the plurality of grader blades provides a more uniform discharge of mixed feed material from the mixing chamber 36.

A further advantage of the grader blades is the reduction of time required to clean out the mixing chamber 36 of the few remaining pounds of feed material. Thus, the operator saves time and reduces wear on the mixer by reducing the number of revolutions of the auger needed to clean out the mixing chamber between feed batches.

It is understood that the number of grader blades may be varied from that shown in the drawings and described above. For example, with two grader blades spaced 180° apart, the mixed feed would be discharged from the mixing chamber twice during each revolution of the auger 38. Four, five or six grader blades can also be utilized, with the blades being substantially equally radially spaced from one another, so as to further increase the frequency of the mixed feed discharge from the mixing chamber.

Also, a stationary vertical feed mixer having grader blades can be used with conveyor type feed systems.

The vertical feed mixer with the grader blades provides for a more uniform discharge flow of feed material during the discharge operation. Therefore, a more even distribution of feed material in the feed trough is achieved, such that all the animals will have an opportunity to consume equal amounts of feed. For example, with the three grader blades as shown in the drawings, a tractor moving at 2 miles per hour along a feed trough with the auger screw rotating at 15 rpm will move 3.9 feet along the trough between each push of feed material, as compared to 11.72 feet of longitudinal movement per revolution of the auger screw when only the leading edge of the flighting is pushing feed material through the discharge opening. With 4–6 grader blades, the distance of travel of the tractor along the feed trough between each feed material push is further decreased per auger revolution.

Whereas the invention has been shown and described in connection with the preferred embodiments thereof, it will be understood that many modifications, substitutions, and additions may be made which are within the intended broad scope of the following claims. From the foregoing, it can be seen that the present invention accomplishes at least all of the stated objectives.

What is claimed is:

1. An improved vertical feed mixer having a bottom wall and a sidewall defining a mixing chamber with an open upper end and a discharge opening, and a vertically oriented auger rotatably mounted within the mixing chamber, the improvement comprising:

a plurality of claws attached to the sidewall adjacent the upper end of the mixing chamber.

2. The improved vertical mixer of claim 1 wherein each claw includes at least one prong spaced apart from the sidewall for engaging and holding feed in the mixing chamber.

3. The improved vertical mixer of claim 1 wherein each claw extends inwardly from the sidewall.

4. The improved vertical mixer of claim 1 wherein each claw has a flange engaging the sidewall for securement thereto, and an inwardly extending portion having a terminal end for retaining feed in the mixing chamber.

5. The improved vertical mixer of claim 1 wherein the claws are equally spaced around the upper end of the mixing chamber.

6. A method for cutting hay bales in a vertical feed mixer having a bottom wall and a sidewall defining a mixing chamber with an open upper end and a discharge opening, a vertically oriented auger rotatably mounted within the mixing chamber, and a plurality of claws extending inwardly from the sidewall adjacent the upper end of the mixing chamber, the method comprising:

loading at least one hay bale into the mixing chamber;

rotating the auger to cut and mix the hay bale in the chamber; and retaining the hay bale and cut portions thereof in the chamber with the claws.

7. The method of claim 6 further comprising holding cut portions of the hay bale with one of the claws to prevent rotation of the portions relative to the auger.

8. A method for cutting hay bales in a vertical feed mixer having a bottom wall and a sidewall defining a mixing chamber with an open upper end and a discharge opening, a vertically oriented auger rotatably mounted within the mixing chamber, and a plurality of claws extending inwardly from the sidewall adjacent the upper end of the mixing chamber, the method comprising:

loading at least one hay bale into the mixing chamber;

rotating the auger to cut and mix the hay bale in the chamber; and impeding rotation of the hay bale and portions thereof with the claws.

9. The method of claim 8 further comprising retaining the hay bale and portions thereof in the chamber with the claws.

\* \* \* \* \*